Oct. 13, 1936.  F. W. PULLEN  2,057,345
BUMPER FOR CARPET SWEEPERS
Filed Aug. 31, 1935
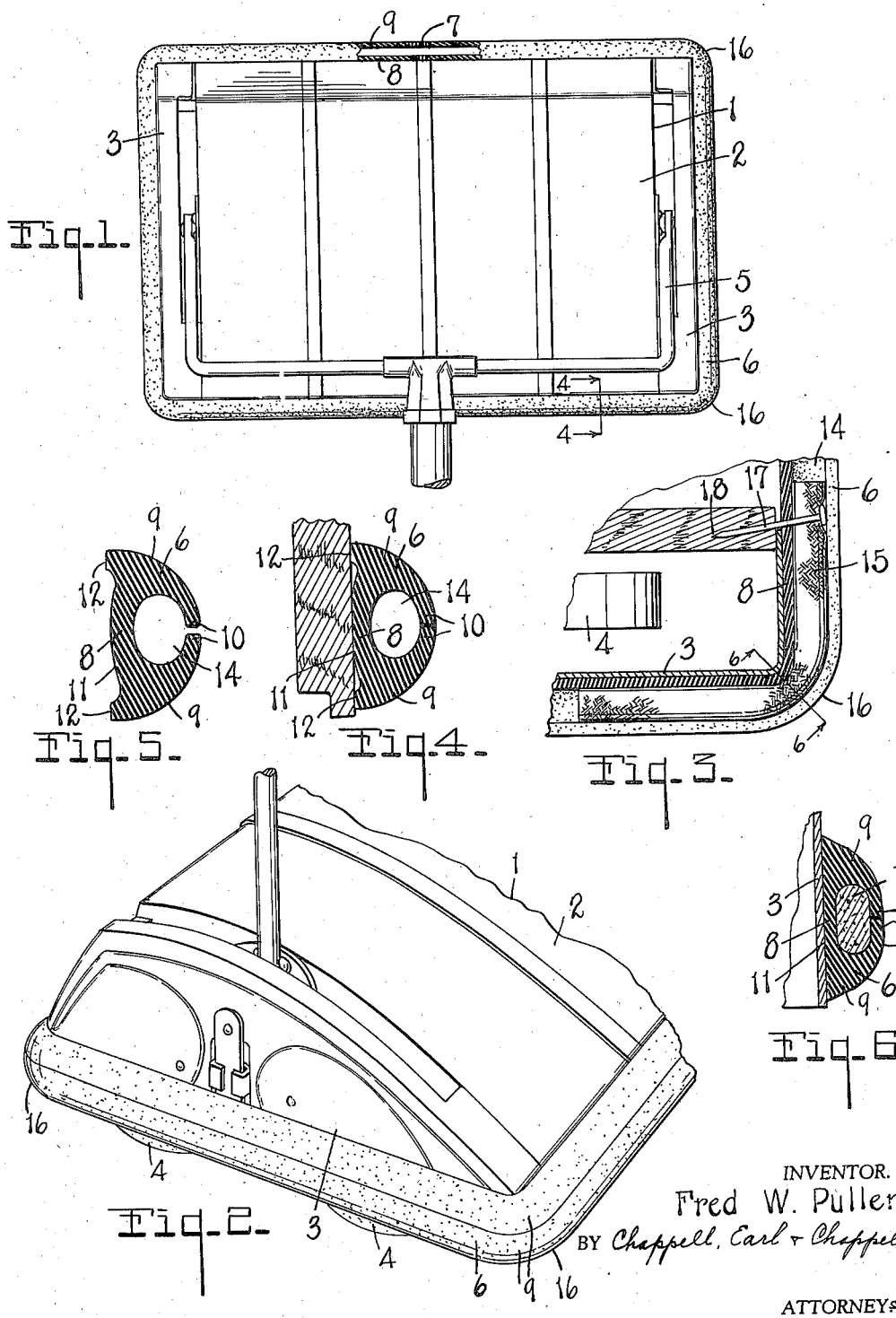
INVENTOR.
Fred W. Pullen
BY Chappell, Carl & Chappell
ATTORNEYS Patented Oct. 13, 1936

2,057,345

UNITED STATES PATENT OFFICE 2,057,345

BUMPER FOR CARPET SWEEPERS

Fred W. Pullen, Grand Rapids, Mich., assignor to Bissell Carpet Sweeper Company, Grand Rapids, Mich.

Application August 31, 1935, Serial No. 38,772

9 Claims. (Cl. 15—45)

The objects of my invention are:

First, to produce a new and improved bumper for a carpet sweeper case.

Second, to provide such a bumper which is of extreme resiliency, very inexpensive and of attractive appearance.

Third, to produce such a bumper of rubber or other resilient material which may be made of a normally straight extruded strip which has the appearance of solid rubber, but which has a cushion effect greater than solid rubber and which is easily and inexpensively installed on a carpet sweeper case.

Fourth, to provide with such a bumper, means for maintaining the attractive appearance of the carpet sweeper when the bumper extends around the corners thereof.

Further objects and advantages pertaining to details and economies of construction and operation will appear from the description to follow. A preferred embodiment of my invention is illustrated in the accompanying drawing, in which:

Fig. 1 is a top plan view of a carpet sweeper with my improved bumper installed, a portion of the bumper being shown in section.

Fig. 2 is a perspective end view of a carpet sweeper case with my improved bumper.

Fig. 3 is a detail sectional view showing the arrangement of the bumper at the corner of the sweeper case.

Fig. 4 is a cross sectional view taken on line 4—4 of Fig. 1, showing the bumper installed on the carpet sweeper case.

Fig. 5 is a sectional view of the extruded rubber strip before it is put in place on the carpet sweeper case.

Fig. 6 is a detail sectional view taken on line 6—6 of Fig. 3.

In the drawing, 1 is a carpet sweeper case which is made up of a central case 2 and end members 3 which are supported on the usual floor wheels 4 which are not shown in detail as they form no part of this particular invention.

5 is the bail of the carpet sweeper. 6 is the bumper which is of resilient material, preferably rubber. The strip is formed of extruded rubber which may be made by automatic machinery much less expensively than the customary molded rubber bumpers for carpet sweepers. The rubber strip 6 is cut to a length less than the periphery of the rectangular carpet sweeper case and the ends are welded together by a rubber welding process as at 7, forming an endless rubber strip. The cross section of the strip is shown in Figs. 4 and 5. A base 8 is provided and walls 9 form a channel in said strip, the walls 9 having their free ends 10 extending from the edges of the base 8 to substantially meet, as shown in Fig. 5. The back 11 of the strip 6 and base 8 forms a case contacting portion and the edges 12 thereof are raised from the adjacent portions of the back contacting base. The reason for this arrangement is that when the bumper is tensioned about the carpet sweeper case by stretching, the case contacting face 11 contacts the case 1 as shown in Fig. 4. The raised edges 12 of the back of the strip contact the case 1 and tend to force the free edges 10 of the walls 9 together as shown. The arched walls give much greater resiliency than would a solid bumper when furniture is bumped during the use of the carpet sweeper. This also tends to give the appearance of a solid piece of rubber, as the tendency for the free ends 10 of the walls 9 to gap is overcome by the force exerted by the raised portions 12 contacting the sweeper case 1 as shown in Fig. 4.

As shown in Fig. 3, each corner of the bumper is provided with a section of cord 15 which is disposed within and substantially fills the core 14 of the strip 6. The piece of cord 15 tends to fill out the hollow core 14 at the corners 16 so that the bumper will not collapse at this point. A nail 17 extends through one end of the cord and through the base 8 of the strip 6 and into the casing at the point 18 as shown in Fig. 3, tending to hold the bumper and the cord in position. The walls 9 of the strip 6 close around the cord and the nail concealing them from view.

This method of fastening the bumper at the corner is most satisfactory, because the cords and nails can be inserted with great facility making the installation of the bumper on the case very inexpensive. The rubber bumper itself is much less expensive than a solid rubber bumper and is more resilient because of the hollow core which is substantially sealed to retain the air therein to serve as a cushion. By forming the strip as I do, it is possible to fasten the bumper to the sweeper without allowing any nails or other fastening means to show.

Having thus described my invention, what I claim as new and desire to secure by Letters Patent is:

1. In a carpet sweeper, the combination of a substantially rectangular case having an endless bumper of normally straight resilient material tensioned therearound, said bumper having a base with walls extending therefrom to meet at a point spaced from the base to form a hollow core and having a case contacting back having its edges raised from the adjacent portions thereof and contacting said case, whereby the meeting walls are forced toward one another, a piece of cord extending around each corner of the case and disposed within and filling said hollow core, and a nail extending through each piece of cord and through said bumper and into said case, said pieces of cord and nails being concealed by said bumper.

2. In a carpet sweeper, the combination of a substantially rectangular case having an endless bumper of normally straight resilient material tensioned therearound, said bumper having a base with walls extending therefrom to meet at a point spaced from the base to form a hollow core and having a case contacting back having its edges raised from the adjacent portions thereof and contacting said case, whereby the meeting walls are forced toward one another, and a piece of cord extending around each corner of the case and disposed within and filling said hollow core.

3. In a carpet sweeper, the combination of a substantially rectangular case having a bumper of normally straight resilient material tensioned therearound, said bumper having a base with walls extending therefrom to meet at a point spaced from the base to form a hollow core and having a case contacting back having its edges raised from the adjacent portions thereof and contacting said case, whereby the meeting walls are forced toward one another, a piece of cord extending around each corner of the case and disposed within and filling said hollow core, and a nail extending through each piece of cord and through said bumper and into said case, said pieces of cord and nails being concealed by said bumper.

4. In a carpet sweeper, the combination of a substantially rectangular case having a bumper of normallly straight resilient material tensioned therearound, said bumper having a base with walls extending therefrom to meet at a point spaced from the base to form a hollow core and having a case contacting back having its edges raised from the adjacent portions thereof and contacting said case, whereby the meeting walls are forced toward one another, and a piece of cord extending around each corner of the case and disposed within and filling said hollow core.

5. In a carpet sweeper, the combination of a case having an endless bumper of normally straight resilient material tensioned therearound, said bumper having a base with walls extending therefrom to meet at a point spaced from the base to form a hollow core and having a case contacting back having its edges raised from the adjacent portions thereof and contacting said case, whereby the meeting walls are forced toward one another.

6. In a carpet sweeper, the combination of a case having a bumper of normally straight resilient material therearound, said bumper having a base with walls extending therefrom to meet at a point spaced from the base to form a hollow core and having a case contacting back having its edges raised from the adjacent portions thereof and contacting said case, whereby the meeting walls are forced toward one another.

7. In a carpet sweeper, the combination of a substantially rectangular case having a bumper of normally straight resilient material tensioned therearound, said bumper having a base with walls extending therefrom to meet at a point spaced from the base to form a hollow core, a piece of cord extending around each corner of the case and disposed withing and filling said hollow core, and a nail extending through each piece of cord and through said bumper and into said case, said pieces of cord and nails being concealed by said bumper.

8. In a carpet sweeper, the combination of a substantially rectangular case having a bumper of normally straight resilient material tensioned therearound, said bumper having a base with walls extending therefrom to meet at a point spaced from the base to form a hollow core, and a piece of cord extending around each corner of the case and disposed within and filling said hollow core.

9. A bumper for a carpet sweeper case comprising a channeled strip of resilient material having a base with the channel forming walls of said strip extending from its edges and over said base and having their free edges substantially meeting, said base having a case contacting back having its edges raised from the adjacent portions thereof to contact the case to force the free edges of said walls together.

FRED W. PULLEN.